United States Patent [19]

Chamberlin, Jr. et al.

[11] Patent Number: 4,889,352

[45] Date of Patent: Dec. 26, 1989

[54] FOLDING MECHANIC'S CREEPER

[76] Inventors: Louis D. Chamberlin, Jr.; Mark D. Chamberlin, both of 34457 Fairview Dr., Yucaipa, Calif. 92399

[21] Appl. No.: 240,543

[22] Filed: Sep. 6, 1988

[51] Int. Cl.[4] .............................................. B62B 11/00

[52] U.S. Cl. ..................................... 280/32.6; 280/37; 280/30

[58] Field of Search .................. 280/30, 326, 325, 37, 280/639

[56] References Cited

U.S. PATENT DOCUMENTS

| | | | |
|---|---|---|---|
| D. 230,971 | 3/1974 | Shanklin | D34/23 |
| 324,617 | 8/1885 | Walsh | 280/37 |
| 989,561 | 4/1911 | Braham | 280/37 |
| 1,098,262 | 5/1914 | Hollingshead | 280/32.6 |
| 1,302,301 | 4/1919 | Broome | 280/32.6 |
| 1,451,858 | 4/1923 | Zengerle | 280/32.6 |
| 1,769,548 | 7/1930 | Rodin | 280/32.6 |
| 3,677,569 | 7/1972 | Larson | 280/32.6 |
| 4,580,799 | 4/1986 | Quinonez | 280/32.6 |
| 4,721,316 | 1/1988 | Whiteside | 280/32.6 |

FOREIGN PATENT DOCUMENTS

| | | | |
|---|---|---|---|
| 48601 | 1/1986 | U.S.S.R. | 280/37 |

*Primary Examiner*—Charles A. Marmor
*Assistant Examiner*—Richard Camby
*Attorney, Agent, or Firm*—Sheldon & Mak

[57] ABSTRACT

A foldable mechanic's creeper that it particularly compact and easy to store includes hinge-connected panel members, each having a panel portion and a peripheral flange portion, the panel members being movable between an open position and a closed position in which the flange portions are in edge-contact for forming a closed container. In the open position, the panel members are rollingly supported on casters for carrying a user in a supine position, the user's head being supported on a padded support that is removably mounted in horizontally spaced relation to one of the panel members. With the panel members in the closed psition, the head support and the casters can be safely enclosed within the container that is formed by the panel members. An extensible mount for the head support serves as a carrying handle for the folded creeper.

13 Claims, 1 Drawing Sheet

FOLDING MECHANIC'S CREEPER

BACKGROUND

The present invention relates to vehicle maintenance and more particularly to a foldable mechanic's creeper that may be conveniently and compactly stored, especially in an automobile or recreational vehicle.

A conventional mechanic's creeper has a low-slung rectangular body-supporting platform with casters at its corners for rollably supporting the mechanic in a supine position beneath a vehicle. A resilient headrest member is usually provided at one end of the platform for supporting the mechanic's head. Although the conventional creepers of the prior art are widely used by professional mechanics in automobile repair facilities, and by serious automotive hobbyists in their home garages, they have limited use in roadside or emergency situations because they are inconvenient or impractical to store in a vehicle.

Various foldable and/or collapsible creeper structures have been disclosed in earlier attempts at overcoming the size limitation of conventional creeper construction. Unfortunately, none of the creepers of the prior art has found wide application in emergency and/or roadside use, particularly for recreational vehicles, because they exhibit one or more of the following disadvantages:

1. They are bulky, requiring more storage space than is available or allocated for vehicle or in-home storage;
2. They are difficult to store in that they are irregularly shaped;
3. They are subject to entanglement with other stored objects, and unwanted contamination by dirt and grime from the storage environment;
4. They are difficult to use in that they are awkward to set-up and awkward to fold or collapse; and
5. They are expensive to produce.

Thus there is a need for a collapsible mechanic's creeper that is particularly compact and easy to store, that is adequately sized and configured for effective support of a user's head as well as his body, that is easy to use and inexpensive to produce.

SUMMARY

The present invention is directed to a foldable mechanic's creeper that meets this need. The creeper includes first and second panel members, each having a panel portion and a peripheral flange portion, the panel portion providing a supportive surface for a user of the creeper; hinge means for connecting the panel means and permitting movement between a coplanar open position and a closed position in which the flange portions are in proximate edge contact forming a closed container; and wheel means for rollingly supporting the panel members above the floor surface in the open position, the wheel means being enclosed within the container when the panel members are in the closed position. Each panel portion provides a supportive surface, the surfaces together supporting a user of the creeper in a supine position above a floor surface when the panel members are in the open position. By forming a closed container in the closed position, the creeper of the present invention is advantageously adapted for convenient storage in typical vehicle locations where other stored articles would otherwise likely become tangled with the folded creeper. Also, the wheel means are protected from damage by foreign objects and contamination from foreign matter within the storage location when the panel members are in the closed position.

The wheel means can be casters, each panel member having a plurality of bosses for mounting the casters. The casters can be removably mounted to the bosses, and the panel members can provide locating means for storing the casters within the container in the closed position. Further, the bosses can extend below the flanged portions of the panel members in the open position, each having a vertically oriented cylindrical cavity for receiving a stem member of a respective caster, the bosses of the first panel being offset from the bosses of the second panel when the panels are in the closed position for permitting the edge contact between the flange members. Preferably the bosses are located for maintaining the panel members in the open position when the user is supported by the supportive surface. Thus no latch or similar feature is needed for maintaining the panel members in the open position when the creeper is in use. For this purpose, the hinge means preferably includes a hinged member that extends between opposite sides of the panel members at the lower extremity of the flange portions when the panel members are in the open position. Thus the panel members are maintained in the open position under loading with the casters being located proximate opposite corners of the open pair of panel members. The hinge member can be cylindrical in cross-section, rotatably engaging at least one of the panel members. Alternatively, the hinge member can be flexible, being formed integrally with the panel members.

In an important feature of the present invention, the creeper can further include handle means movably engaging one of the panel members for carrying the creeper when the panel members are in the closed position, the handle means having extended and retracted positions, and head support means for supporting the user's head by the handle means in horizontally spaced relation to the panel member with the handle means in the extended position, the user's body being supported by the panel members. Preferably the head support means includes a support member that is removably connected to the handle means, the panel members providing means for locating and storing the support member when the panel members are in the closed position and the handle means is in the retracted position. Thus the panel members of the present invention can be advantageously sized smaller than would otherwise be required for supporting the user's body and head. The handle means can form a U-shaped member having leg portions that axially engage the panel member, and a connecting handle portion, the support member having a U-shaped groove on its underside for engaging the handle portion and its connecting leg portions. Preferably the support member is adapted for gripping the handle member so that it will not become inadvertently dislodged while in use.

DRAWINGS

These and other features, aspects, and advantages of the present invention will become better understood with reference to the following description, appended claims, and accompanying drawings where:

DESCRIPTION

Figure 1:
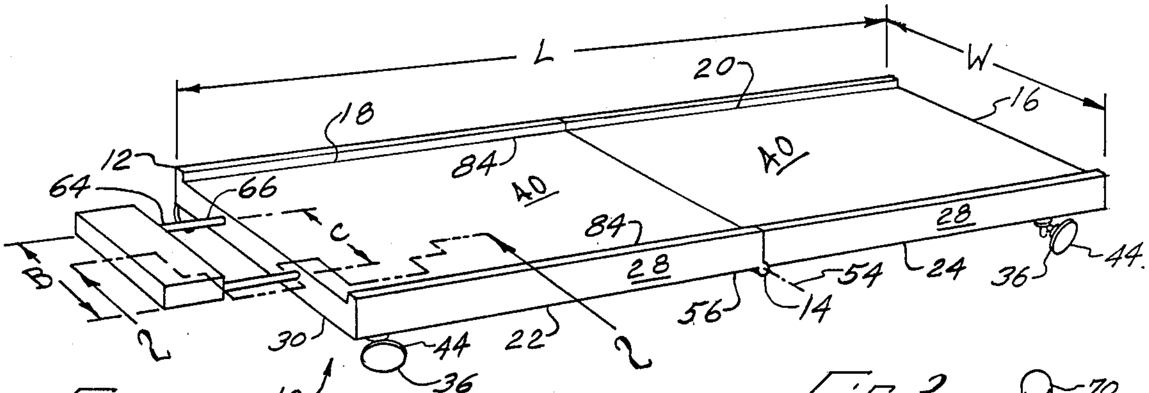
FIG. 1 is an oblique side elevational perspective view of a foldable mechanic's creeper according to the present invention.

The present invention is directed to a foldable mechanic's creeper that forms a particularly small and easily stored package until it is needed, yet provides effective support of a user's head as well as his body. With reference to FIGS. 1-4 of the drawings, a creeper 10 according to the present invention includes a first panel member 12 that is connected by hinge means 14 to a second member 16. The hinge means 14 provides that the panel members 12 and 16 can be moved between an open position as shown in FIG. 1 and a closed position as shown in FIG. 3. Each of the panel members 12 and 16 has a corresponding body-supporting panel portion, respectively designated first panel portion 18 and second panel portion 20. As shown in the drawings, the panel portions 18 and 20 are rectangular in a preferred configuration of the creeper 10. The downwardly extending flange portions, respectively designated first flange portion 22 and second flange portion 24, each include a hinge flange section 26 for connecting the hinge means 14, a pair of oppositely disposed side flange sections 28, and an end flange section, the end flange sections being separately designated first end flange section 30 of the first flange portion 22, and second end flange section 32 for the second portion 24.

Figure 2:
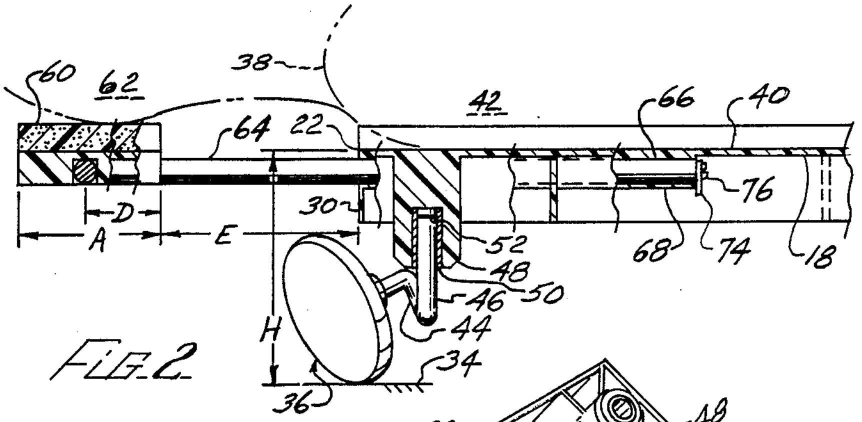
FIG. 2 is a fragmentary sectional elevational view of the creeper of FIG. 1 on line 2—2 of FIG. 1.
Figure 3:
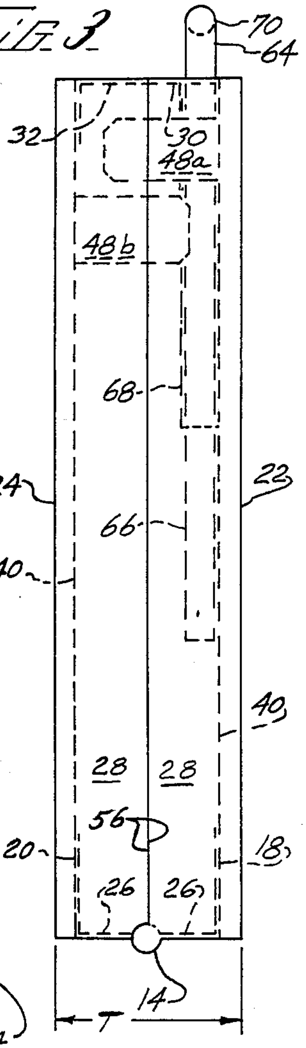
FIG. 3 is an edgewise elevational view showing the creeper of FIG. 1 in an upright, folded condition.

As shown in FIGS. 1 and 2, the panel members 12 and 16 are rollingly supported in the open position above a suitable floor surface 34 by wheel means 36 for supporting a user 38 in a supine position. In this position, the panel portions 18 and 20 each provide respective coplanar supportive surface 40 for carrying a body portion 42 of the user 38. The wheel means 36 includes a plurality of casters 44, each caster 44 having a vertically extending stem member 46 that is rotatably supported by a respective boss 48, the first panel member 12 having a pair of the bosses, designated 48*a*, the second panel member 16 having another pair of the bosses, designated 48*b*. In a preferred embodiment of the present invention, the bosses 48 are formed integrally with the respective panel members 12 and 16, each boss 48 including a tubular metallic insert 50 for removably receiving a corresponding stem member 46 of a respective caster 44. The stem members 46 are grooved, each carrying a conventional split ring 52 that is adapted for gripping the inside of a respective sleeve 50 in a conventional manner for retaining the casters 44 in engagement with the bosses 48.

In an exemplary configuration of the present invention shown in the drawings, the panel members 12 and 16 are proximately rectangular, the bosses 48 being located proximate corners thereof opposite the hinge means 14. As best shown in FIG. 3, the pair of bosses 48*b* are offset from the bosses 48*a* for permitting edge contact between the first flange portion 22 and the second flange portion 24 in the closed position with the bosses 48 extending beyond the respective flange portions 22 and 24.

Figure 4:
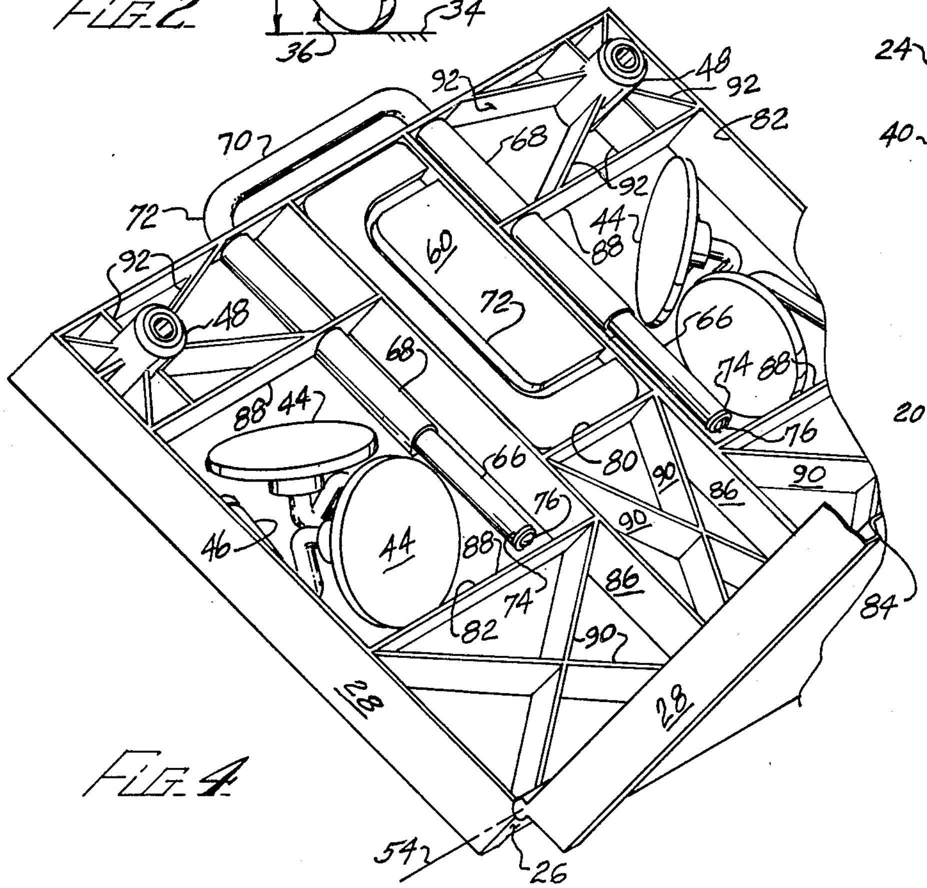
FIG. 4 is a fragmentary oblique perspective view showing the creeper of FIG. 1 in an inverter, partially folded condition.

As shown most clearly in FIGS. 1 and 4, the hinge means 14 connects the first panel member 12 and the second panel member 16 along a hinge axis 54, the hinge axis 54 being located proximate a bottom edge 56 of the first and second flange portions 22 and 24. Thus with the creeper 10 supporting the body portion 42 of the user 38 on the supportive surfaces 40, the panel members 12 and 16 are maintained in the open position, the adjacent hinge flange sections 28 being loaded in facing contact.

As shown in FIG. 1, a head support member 60 is supportively connected to the first panel member 12 for supporting a head portion 62 of the user 38 in horizontally spaced relation to the first panel member 12. The head support member 60 is connected to the first panel member 12 by a U-shaped member 64 having spaced-apart leg portions 66 that protrude the first end flange section 30 of the first flange portion 22 of the first panel member 12, the leg portions 66 being slidably supported in respective tubular guide portions 68 of the first panel member 12. The U-shaped member 64 is movable between an extended position shown in FIGS. 1 and 2 and a retracted position shown in FIGS. 3 and 4. For carrying the creeper 10 when the panel members 12 and 16 are in the closed position, a handle portion 70 of the U-shaped member 64 extends between the leg portions 66 thereof. The head support member 60 is formed with a U-shaped slot 72 therein for attaching the support member 60 to the U-shaped member 64. Preferably the U-shaped slot 72 has a profile that is slightly different than the shape of the relevant portion of the U-shaped member 64 so that a slight inference fit is produced. Thus the head support member 60 grips the U-shaped member 64 when attached thereto. For further stability of the support member in use, the leg portions 66 are spaced apart by a distance C that is only slightly less than a length B of the support member 60. Also, the handle portion 70 of the U-shaped member 64 is located by the slot 72 at a transverse distance D within the support member 60 from a side thereof closest to the first panel member 12, the distance D being more than half of a width A of the support member 60. In a preferred configuration of the present invention, the width A is approximately 2.5 inches, the length B is approximately 8 inches, the distance C is approximately 6 inches, and the distance D is approximately 2 inches. Further, the overall length of the U-shaped member 64 from the handle portion 70 to the opposite ends of the leg portions 66 is approximately 11 inches, such that the head support member 60 is spaced horizontally from the first panel member 12 by a distance E of approximately 5 inches when the U-shaped member 64 is in the extended position.

In the exemplary embodiment of the present invention shown in the drawings, the U-shaped member 64 is fabricated from an elongated steel bar of circular cross-section. As best shown in FIG. 2, a stop member 74 is attached to the end of each leg portion 66 by a suitable screw fastener 76 for preventing withdrawal of the U-shaped 64 from the first panel member 12 beyond the extended position. Alternatively, the U-shaped member 64 can be fabricated from tubular steel, or molded from a suitable plastic material.

As best shown in FIG. 4, the first panel member 12, together with the second panel member 16, form a closed container for the head support member 60 and the casters 44 during transport and storage of the creeper 10, the respective flange portions 22 and 24 being in edge-to-edge contact completely surrounding the respective panel portions 18 and 20. In particular, the first panel member 12 is formed to have separate storage compartments, including a head support compartment 80 and a pair of wheel compartments 82, each wheel compartment 82 being adapted for locating and storing a pair of the casters 44.

The first and second panel members 12 and 16 are preferably molded from a lightweight, high-strength plastic material. As shown in the drawings, the panel members 12 and 16 are formed to have a relatively thin cross-sectional thickness, the flange portions 22 and 24 being configured for strengthening the panel members 12 and 16 for effective support of the user 38. For this purpose, the side flange sections 28 are joined to the respective panel portions 18 and 20 by respective ledge portions 84, the ledge portions 84 having an L-shaped cross-section, extending upwardly and outwardly from the panel portions 18 and 20, the side flange sections 28 extending downwardly from the outward extremities of the ledge portions 84. Additional strength for the panel members 12 and 16 is provided by a plurality of spine flange sections 86 that extend downwardly from the panel portions 18 and 20, connecting the hinge flange sections 26 and the first end flange section 30 and the second end flange section 32 of the respective panel members 12 and 16. In addition to strengthening the panel members 12 and 16, the spine flange sections 86 also function as dividers between the wheel compartments 82 and the head support compartment 80. Similarly, a plurality of rib flange sections 88 extend between the side flange sections 28 and the spine flange sections 88 for stiffening the panel portions 18 and 20 in a direction orthogonal to the spine flange sections 86, the rib flange sections 88 forming end walls for the wheel compartments 82. Also, a plurality of X-flange sections 90 extend between the rib flange sections 88 and the hinge flange sections 26, primarily for stiffening the attachment of the hinge means 14 to the respective first and second panel members 12 and 16. Moreover, a plurality of gusset flange sections 92 are provided between the bosses 48 and the adjacent flange sections 28, 30, 32, and 88 for rigidly connecting the bosses 48 to the respective panel members 12 and 16. Thus the panel members 12 and 16 are configured for molding from a suitable lightweight high-strength plastic material for effective support of the user 38.

In a preferred configuration of the creeper 10, the panel members 12 and 16 are formed for providing a width W of 13 inches and a combined length L in the open position of 30 inches as shown in FIG. 1. Thus the creeper 10 of the present invention provides an overall length for support of the user's head 62 and body 42 of about 37.5 inches, yet in the closed position the creeper 10 forms a container having a length L/2 of only about 15 inches, the width W of 13 inches, and a thickness T of about 3.25 inches in the preferred configuration. In use, the supportive surfaces 40 of the panel members 12 and 16 are rollingly supported at a height H of approximately 4 inches above the floor surface 34.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A mechanic's creeper comprising:

(a) first and second panel members, each comprising a panel portion having a supportive surface for a user of the creeper, and a peripheral flange portion extending therefrom;

(b) hinge means for connecting the panel members, the hinge means permitting the panel members to be moved between an open position wherein the panel members are substantially coplanar for supporting the user's body in a supine position above a horizontal floor surface and a closed position wherein the respective flange portions are in proximate edge contact, the panel members together forming a closed container;

(c) wheel means for rollingly supporting the panel members above the floor surface in the open position;

(d) a head support member for supporting the user's head;

(e) means for supportively connecting the head support member in horizontally spaced relation to the first panel member with the panel members in the open position, the head support member being located horizontally beyond the first panel member from the second panel member; and (f) means for storing the head support member within the container when the panel members are in the closed position.

2. The apparatus of claim 1 wherein the wheel means are casters, each panel member having a plurality of bosses for mounting the casters.

3. The apparatus of claim 2 wherein the casters are removably mounted to the respective bosses, the panel members forming locating means for storing the casters within the container in the closed position.

4. The apparatus of claim 3 wherein each caster comprises a stem member, the bosses each having a vertically oriented cylindrical cavity therein for receiving a respective stem member, the bosses extending below the flange portions of the panel members in the open position for supporting the stem member against tipping under load, the bosses of the first panel being offset from the bosses of the second panel when the panels are in the closed position.

5. The apparatus of claim 3 wherein the bosses are located for maintaining the panel members in the open position when the user is supported by the supportive surface.

6. The apparatus of claim 5 wherein the hinge means comprises a hinge member, the hinge member extending between opposite sides of the panel members and being located at the lower extremity of the flange portions with the panel members in the open position.

7. The apparatus of claim 6 wherein the hinge member is cylindrical in cross-section, rotatably engaging at least one of the first and second panel members.

8. The apparatus of claim 6 wherein the hinge member is a flexible member formed integrally with the first and second panel members.

9. The apparatus of- claim 1, further comprising:

(a) handle means movably engaging the first panel member for carrying the creeper with the panel members in the closed position, the handle means having extended and retracted positions, (b) wherein the means for supportively connecting the head support member comprises means for supporting the head support member by the handle means in horizontally spaced relation to the first panel member with the handle means in the extended position.

10. The apparatus of claim 9 wherein the head support member is removably connected to the handle means, the panel members forming locating means for storing the head support member when the panel members are in the closed position and the handle means is in the retracted position.

11. The apparatus of claim 9 wherein the handle means comprises a U-shaped member-having spaced apart leg portions and a connecting handle portion, the leg portions axially engaging the first panel member, the head support member having a U-shaped groove formed therein for engaging the handle portion and the leg portions of the handle member.

12. The apparatus of claim 11 wherein the head support member is adapted for gripping the handle member.

13. A mechanic's creeper comprising:

(a) first and second panel members, each panel member comprising:
 (i) a panel portion having a supportive surface for a user of the creeper;
 (ii) a peripheral flange portion extending from the panel portion; and
 (iii) a plurality of bosses, each boss having a cylindrical cavity therein, the cavities extending generally perpendicular to the supportive surface;

(b) hinge means for connecting the panel members, the hinge means permitting the panel members to be moved between an open position wherein the panel members are substantially coplanar for supporting the user in a supine position above a horizontal floor surface and a closed position wherein the respective flange portions are in proximate edge contact, the panel members together forming a closed container, the hinge means comprising a hinge member, the hinge member extending between opposite sides of the panel members and being located at a lower extremity of the flange portions when the panel members are in the open position;

(c) a plurality of casters for rollingly supporting the panel members above the floor surface in the open position, each caster comprising a stem member for removable mounting to a respective boss, the stem member engaging the cylindrical cavity;

(d) handle means movably engaging the first panel member for carrying the creeper with the panel members in the closed position, the handle means having extended and retracted positions, the handle means comprising a U-shaped member having spaced apart leg portions and a connecting handle portion, the leg portions axially engaging the first panel member; and (e) a head support member for supporting the user's head by the handle means in horizontally spaced relation to the first panel member with the handle means in the extended position, the user's body being supported in a supine position by the supportive surfaces of the panel members, the head support member having a U-shaped groove formed therein for removably engaging the handle portion and the leg portions of the handle member, wherein the bosses are located for maintaining the panel members in the open position when the user is supported by the supportive surface, the bosses extending below the flange portions of the panel members in the open position for supporting the stem member against tipping under load, the bosses of the first panel being offset from the bosses of the second panel when the panels are in the closed position, whereby the wheels are enclosed within the container when the panel members are in the closed position, the panel members forming locating means for storing the casters and the head support member within the container when the panel members are in the closed position and the handle means is in the retracted position.

* * * * *